though the pores of which air may pass freely.

2,777,824
PROCESS FOR MAKING MICRO-RETICULATED MATERIAL

Harry R. Leeds, Bronx, N. Y., assignor to The Perma-Stamp Products Corporation, New York, N. Y., a corporation of New York No Drawing. Application June 27, 1950,
Serial No. 170,700

8 Claims. (Cl. 260—2.5)

This invention relates to the production of a material having a micro reticulated structure. More particularly, the invention relates to the production of a highly porous plastic resin, the pores of which are of microscopic proportions and may be filled with ink or other liquid.

By "micro reticulated structure" I refer to a solid substance having an interconnected network of open spaces, wherein the open spaces are of microscopic proportions.

One of the major problems in printing operations of all types is the inking of the type faces. Most of the mechanism of printing presses and a major part of the manipulation of hand stamps is concerned with the transfer of ink or marking substance to the printing surfaces.

It has been proposed that one means of eliminating the difficulties of the inking operation is to incorporate the ink materials or substances into the printing plate materials, for example, by making the printing plate of a sponge-like material which will retain ink.

An object of the invention, therefore, is to produce a material having a micro reticulated structure.

A further object is to produce a plastic resin printing plate containing within its own structure a sufficient supply of ink to render the supply of ink from a separate source unnecessary.

A further object is to produce a printing stamp capable of making many thousands of impressions without any appreciable change in the appearance of the impressions.

A further object is to produce a marking material such as printing plates or stamp forms having the advantage of low cost, improved print quality and ease of manufacture.

A still further object is to produce a material having a micro reticulated structure that in thin sections is resistant to moisture but through the pores of which air may pass through freely.

I have found that such material having a micro reticulated structure may be formed by combining a resin, such as polyvinyl chloride, polyvinyl acetate, polyvinyl butyral polyethylene, or homologues of these and such other materials which perform the function described below with a plasticizer and stabilizer to form a paste and adding a material which is compatible with the paste but which is incompatible with the fused material. About 40–160 parts of plasticizer are generally used for each 100 parts of resin. In some cases this range may be greatly extended in both directions.

Material of this type suitable for the production of ink filled marking material such as stamp forms, printing plates, type keys or the like can be produced by using as the ink vehicle a material which is compatible with the paste but incompatible with the fused material and bearing a colorant.

Thus upon heating the mixture the ink vehicle bearing the colorant will be exuded and entrapped within the pores of the fused material. A slight pressure upon the material, as that exerted upon an ordinary stamp, will release sufficient ink to make a clear impression.

The resins may be classified as casting resins, plastisols or organisols, hot melts, and miscellaneous setting materials.

The mechanism of formation of the reticulated porous structure is as follows: When the resin fuses, the emulsion is broken and the incompatible vehicle containing any dissolved addends is expressed from the resin structure and forms an interconnected network of fine pores through the mass of the resin material.

While dye type inks are preferred it is possible to use pigmented inks if the pigment has a high degree of dispersion and fineness. The dispersion types are to be preferred for these types of marking materials since the pore sizes are generally larger.

Volatile ink vehicles can also be used since some of the materials set at or near room temperature and for those that do not the use of a vapor tight pressure container will prevent the loss of vehicle during the curing operation.

The proportions of the vehicle to the resin mixture may vary widely but, since the maximum amount of ink consistent with a strong structure is desired, the proportions do not vary much from half of each by volume. In some cases it may be possible to run the ink content up to 80% and in some cases considerably less than the 50% will cause undesirable weakening of the resin and difficulties in curing.

The following are examples of materials having a micro reticulated structure carrying within their pores a supply of ink; the parts are given by weight:

Example 1

50 parts polyvinyl chloride and 5 parts Tribase (tribasic lead sulfate) were mixed with 50 parts of Sovaloid C (a light-bodied "true softener" oil, composed entirely of aromatic hydrocarbons, flash point 335° F., distillation range 580–760° F., nonpolar in character) to form a paste or plastisol. To this paste was added 5 parts of methyl violet together with 100 parts of ethylhexanediol, serving as a vehicle therefor. The mixture was poured into a stamp mold and heated at a temperature of about 300 to 350° F. for a period of about 10 to 25 minutes.

A handle was attached to the stamp thus produced and about 1000 impressions were made by hand. The stamp was then placed in an ordinary press and about 10,000 additional continuous impressions were made without any appreciable change in appearance.

Impressions made with this stamp were found not to smear. It was also found to be dimensionably stable, so that the impressions made showed no distortion.

A considerable advantage of this type of stamp is the uniformity of the impressions. When using an ordinary type stamp which must first be inked from a stamp pad, the first impression is often too dark and tends to blur, and if used several times becomes light and indistinct.

Printing plates made of a material having a micro reticulated structure in accordance with the present invention may contain enough ink to be used daily for several years and the impressions will always be clear and uniform.

Example 2

50 parts polyvinyl chloride and 5 parts Tribase (tribasic lead sulfate) were mixed with 50 parts of dioctyl phthalate to form a paste. To this paste was added 5 parts of methyl violet together with 100 parts of glycerol monoricinoleate, serving as a vehicle therefor. The mixture was poured into a stamp mold and heated at a temperature of about 300 to 350° F. for a period of about 10 to 25 minutes.

Example 3

50 parts polyvinyl chloride and 5 parts Tribase (tribasic lead sulfate) were mixed with 50 parts of tricresyl phosphate to form a paste. To this paste was added 5 parts of methyl violet together with 100 parts of ethyl hexanediol and serving as a vehicle therefor. The mixture was poured into a stamp mold and heated at a temperature of about 300 to 350° F. for a period of about 10 to 25 minutes.

The molecular size of the particles of vinyl chloride used in the examples is of such a nature that their mixture with the plasticizer is on the border line between a colloidal dispersion and an actual molecular solution. In the above examples as well as in the appended claims we have used the term "paste." It will be understood that this is intended to cover either a colloidal dispersion, or mixture as the case may be.

Material made in accordance with any of the above examples could advantageously be used as type keys, on typewriters or computing machines, thus eliminating the necessity of ribbons. The small amount of flexibility which may be obtained in this material would give a more perfect impression than can be obtained with the typewriter keys now in use. It is self-evident that that would be very convenient for the typist. The keys would retain enough ink for such typewriter to be used daily for several years and the impressions would remain consistently clear.

Acid bearing stamps for metals can also be made in accordance with this invention.

The material may also be thinned as by the addition of a larger quantity of plasticizer to form a coating composition and applied to paper to produce a long lasting carbon paper.

The material will hold a large supply of ink sufficient to last a considerable time. However, when such ink is used up the material may be refilled.

Material having a micro reticulated structure but not filled with ink may be made by using in place of the ink and ink vehicle a material which will volatilize out of the plastic resin after it is cured such as xylene, ethyl alcohol or isopropyl alcohol.

An example illustrating the production of such material is given as follows, the parts being by weight:

*Example 4*

100 parts of polyvinyl chloride mixed with 100 parts of dioctyl phthalate, and 10 parts of Tribase (tribasic lead sulfate). 400 parts of xylene were added and the mixture was heated to approximately 350° F. As the resin became fused, a material having a micro reticulated structure was formed from which the xylene was readily evaporated.

The curing of the resin must be effected under a pressure equal to or greater than the vapor pressure of the xylene or other material compatible with the liquid mixture but incompatible with the fused resin, since it is essential that such material does not volatilize before the resin is fused. After the resin is fused and the reticulated structure is formed, the pressure may be released and the xylene may be driven off and reclaimed, leaving the resin behind with open pores. The material may be filled with ink and used as a printing plate, if desired, or used with open pores. As such, it provides a good material for articles such as raincoats, since the pores are so small that the material is impervious to water but will permit passage of air therethrough.

While I have described my invention with reference to particular embodiments thereof, it will be understood that variations may be made therein without departing from the scope of the invention.

What I claim is:

1. A process for the production of plastic resin having a microporous microreticulated structure which comprises heating a mixture comprising a thermoplastic resin selected from the group consisting of polyvinyl chloride, polyvinyl acetate, polyethylene and polyvinyl butyral, a plasticizer for the resin and an organic liquid which is a nonsolvent for the resin, to a temperature at which said resin fuses under a pressure sufficient to maintain said liquid in the liquid phase until a microreticulated structure is formed.

2. A process in accordance with claim 1, in which the liquid is volatile and is volatilized after formation of the microreticulated structure.

3. A process in accordance with claim 1, in which the resin-plasticizer-organic liquid mixture is a plastisol.

4. A process in accordance with claim 1, in which the liquid is glycerol monoricinoleate.

5. A process in accordance with claim 1, in which the liquid is xylene.

6. A process in accordance with claim 1, in which the liquid is ethylhexanediol.

7. A process in accordance with claim 1, in which a coloring agent is disposed in the organic liquid prior to the heating.

8. A process in accordance with claim 7, in which the coloring agent is methyl violet.

References Cited in the file of this patent

UNITED STATES PATENTS

| Number | Name | Date |
|---|---|---|
| 1,092,512 | Aylsworth | Apr. 7, 1914 |
| 2,160,054 | Bauer | May 30, 1939 |
| 2,371,868 | Berg et al. | Mar. 20, 1945 |
| 2,392,521 | Chollar | Jan. 8, 1946 |
| 2,505,353 | Fisk | Apr. 25, 1950 |
| 2,507,688 | Armstrong | May 16, 1950 |
| 2,542,527 | Honey et al. | Feb. 20, 1951 |
| 2,559,609 | Foust | July 10, 1951 |

OTHER REFERENCES

Morrell: Synthetic Resins, 2nd edition, 1943, pages 189–190.

Todd-Sanford: Clinical Diagnosis by Laboratory Methods, page 290, 1941 edition.

Burleson: Modern Plastics, August 1947, pages 108–111.

Clarkson et al.: Chemistry and Industry, October 29, 1949, pages 751–755.